Nov. 11, 1969         A. M. MUNCHERYAN         3,478,278
         DIRECTED-BEAM PORTABLE LASER SYSTEM WITH
               SELF-CHARGING POWER SUPPLY
Filed July 6, 1965                         3 Sheets-Sheet 1
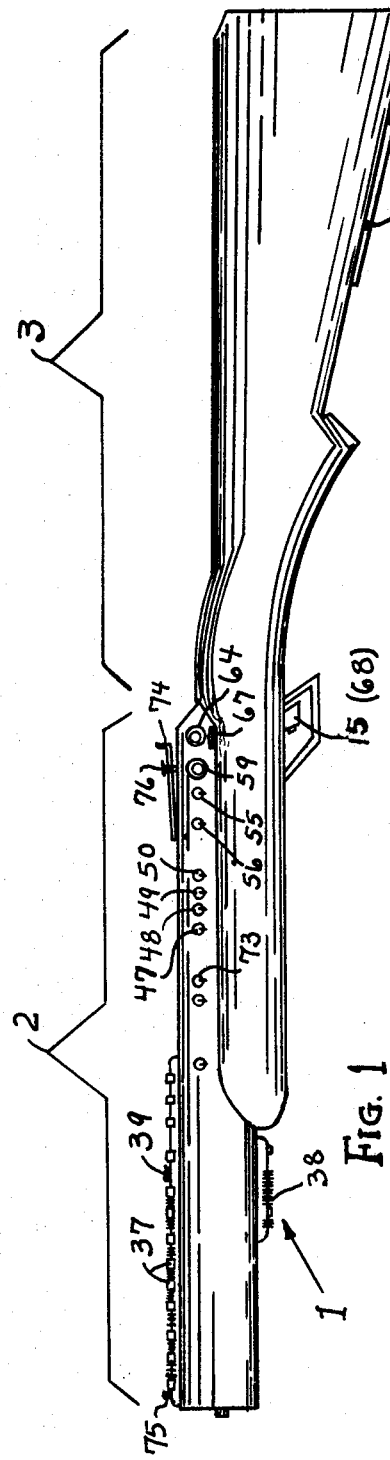
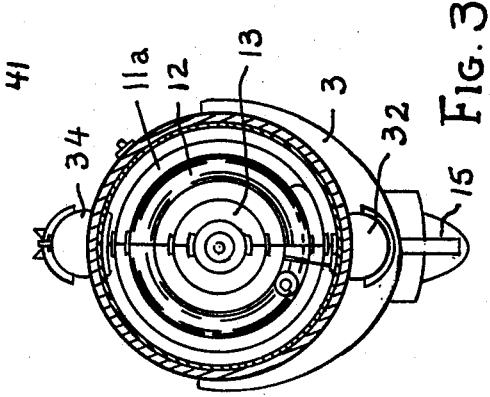
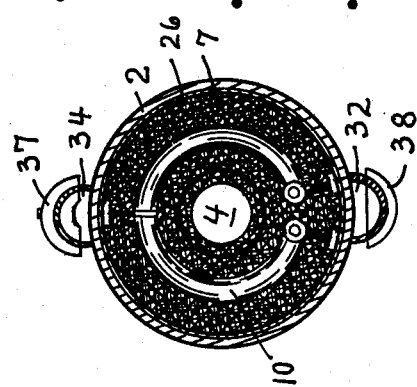
Arthur M. Muncheryan { # United States Patent Office

3,478,278
Patented Nov. 11, 1969

3,478,278
DIRECTED-BEAM PORTABLE LASER SYSTEM WITH SELF-CHARGING POWER SUPPLY
Arthur M. Muncheryan, 1735 Morningside St.,
Orange, Calif. 92667
Filed July 6, 1965, Ser. No. 469,560
Int. Cl. H01s 3/04
U.S. Cl. 331—94.5    11 Claims

ABSTRACT OF THE DISCLOSURE

A directed-beam portable system with a self-charging power supply is described. The system comprises a rifle-configured housing containing a plurality of solid-state laser rods individually activated by flashtubes therein receiving high-voltage pulsed current from a bank of capacitors energized by said power supply through a step-up transformer. The power supply comprises doped silicon solar cells activated radioactively fluorescing material therebetween. Three series-connected switches provided in the power supply trigger the capacitor bank to discharge through the flashtubes to activate the laser rods. Fiber optics cones interposed contiguously in the axial relations of said laser rods concentrate the laser radiation and form a parallel beam for projection thereof from the front end of said system. Laser cooling fluid means and a temperature indicating means are also provided in said system.

---

The present invention relates to laser generators and more particularly to a high-intensity laser generating system in which the laser radiation is produced regeneratively and amplified by a multiple array of laser-amplifying means.

This invention is an improved embodiment of the portable laser generator described and claimed in an application filed by me in the United States Patent Office on June 2, 1964, Serial No. 371,994, in which I have disclosed a portable laser generator having a single ruby-type laser source energized by a flashlamp receiving current from an electric D-C battery rechargeable from a 110-volt household power source. Whereas, in the present improved embodiment, the laser radiation is produced by three ruby-type laser sources, each aiding to stimulate (excite) the other to emission. The laser sources are illuminated by a bank of xenon flashlamps. The emitted laser radiation is further amplified by a plurality of light-gathering optical means alternately arranged in axial relation with the laser sources to concentrate the emergent laser radiation to a high-intensity laser beam. In addition, the rechargeable power-supply battery can be charged either from an external current source or from the solar cells provided in the laser generator and communicating with the rechargeable battery. The laser generator is safe to handle or store away without fear of self activation of the laser generator, because of a system of interlock switches which have to be manipulated before the generator can be triggered.

For its principal advantage, the laser generator is provided with a multiple array of solid-state laser emitters which receive high-intensity radiant energy from a bank of flashlamps, each illuminating a respective laser emitter to produce a coherent and monochromatic radiation in the spectral range of 6800 to 9000 angstroms (which range extends to infrared) or 3800 to 4000 angstroms (in the ultraviolet range), depending on the laser emitting material used in the generator.

An object of the invention is to arrange the laser emitting sources, which are cylindrical rods, in their axial aspect one to another so that the laser radiation emitted from one laser source interacts with the radiation from the other, thereby reciprocally stimulating each other to an increased-intensity laser radiation.

A further object of the invention is to provide a series of conical radiation-concentrating means disposed alternately with the laser emitters to intensify the laser beam incident thereupon from one adjacent laser rod, transmit it to another adjacent thereto, and finally to converge the laser radiation to a pencil beam before emergence from said generator.

Another object of the invention is the provision of a D-C battery rechargeable from an external power source or by receiving a continuously charging current from a bank of solar cells contained in the generator housing.

A still further object of the invention is to provide a means for converting the direct current from the battery to a pulsating current so that the voltage can be stepped up by means of a transformer, contained within the generator, prior to applying the voltage to the flashlamps for energizing them to a high-intensity light radiation.

One other object of the invention is the provision of a fluid means for circulating through the system and cooling the laser emitters and the associated parts thereof heated by the radiant energy of the flashlamps.

Other objects and advantages of my invention will be best understood from a consideration of the following specification taken in conjunction with the accompanying drawing forming part thereof, wherein:

FIGURE 1 is a plan view of the high-intensity portable laser generator,

FIGURE 2 is a cross-sectional view of the laser generator taken at A–A',

Figure 4:
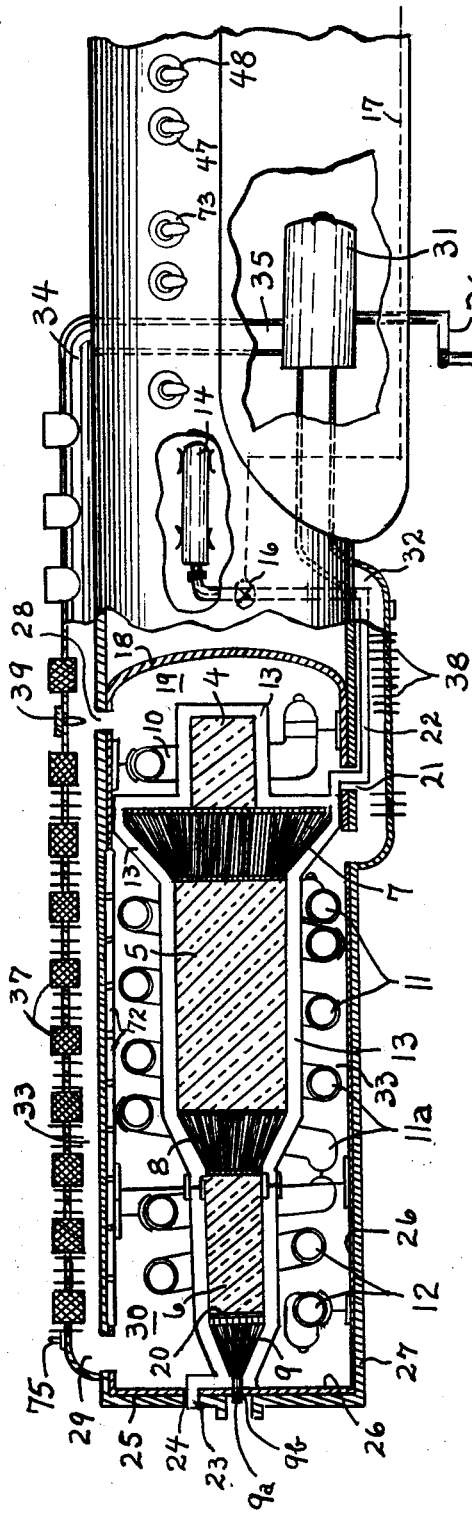
Figure 5:
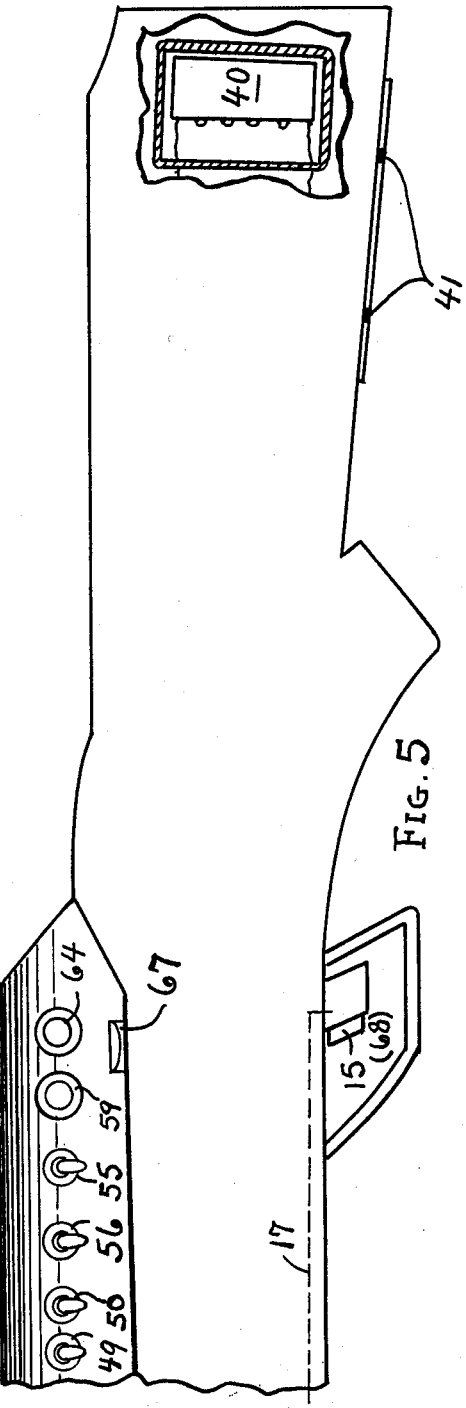
Figure 6:
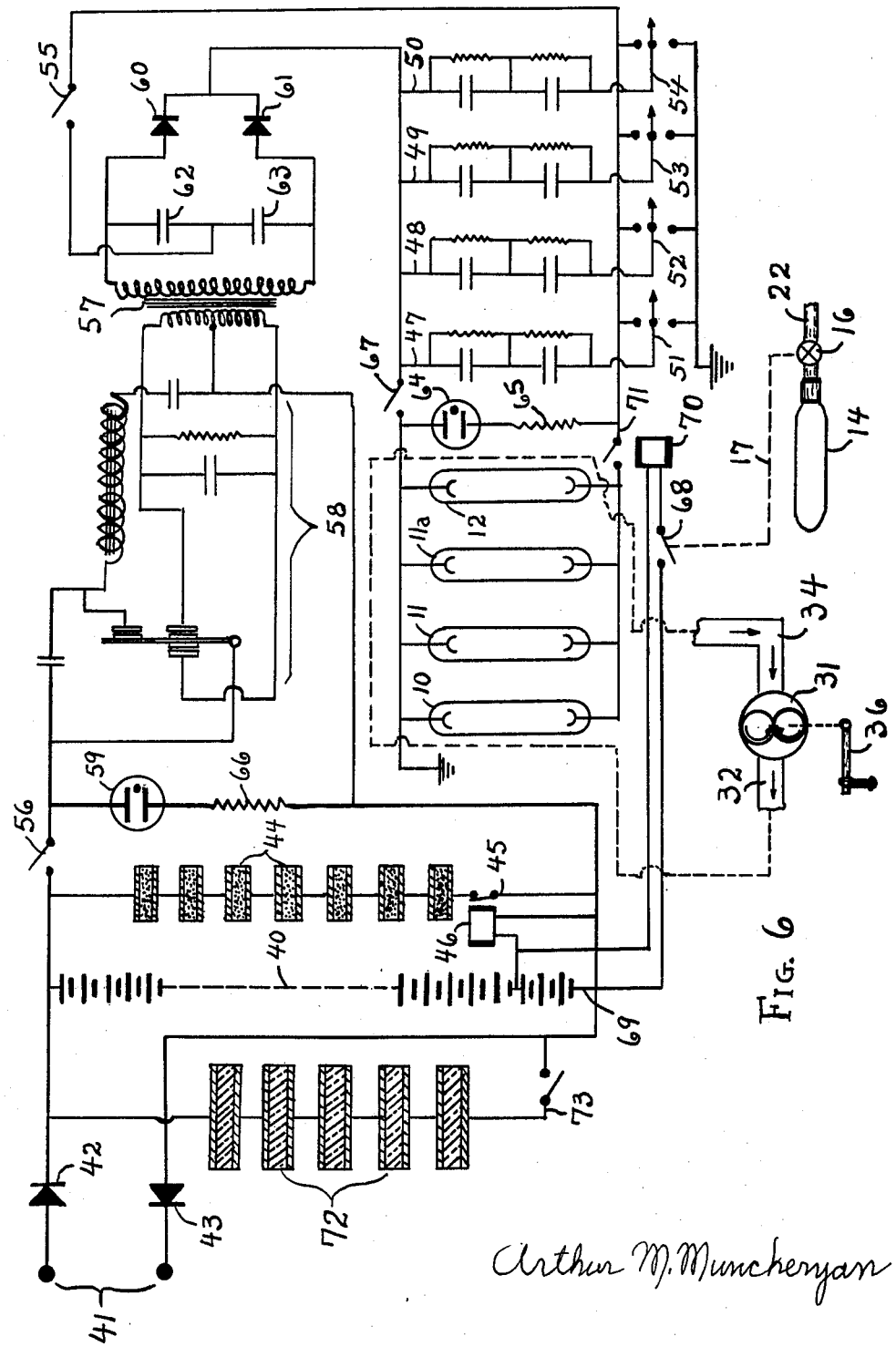

FIGURE 3 is another cross-sectional view of the laser generator taken at line B–B', FIGURE 4 is an enlarged partial view of the laser generator, with a cutout portion showing the axial, sectional view of the laser generator disposed within the forward chamber of the generator housing, FIGURE 5 is a plan view of the remaining portion of the laser generator as illustrated in FIGURE 4, FIGURE 6 is a schematic circuit diagram of the power supply, its connections to the flashlamps, and the associated parts, FIGURE 7 is a cross-sectional view of the solar cell requiring an external illumination to activate it for generating a voltage, and FIGURE 8 is a cross-sectional view of the self-activating type solar cell.

In principle, generation of laser from a solid-state laser material consists of irradiating the laser material, such as a ruby rod or neodymium-doped glass rod, with a high-intensity light such as that from a xenon flashlamp, producing a natural fluorescence in the rod, and amplifying the intensity of the fluorescence by oscillating the radiation in the rod by reflection from one mirrored end surface of the rod to the other before being projected therefrom. One of the mirrored end surfaces contains a thinner reflective coating than the other, so that when the oscillating radiation reaches a high level of radiant density beyond the threshold of laser excitation energy, the laser beam emerges from the thinly coated end. To further amplify the laser beam intensity, the present invention (FIGURE 4) comprises alternate fiber optics cones interposed between the laser rods to converge the laser beam to a smaller diameter, thus increasing the radiation density. Furthermore, by positioning the rubies axially to each other the radiant beam from one ruby magnifies the intensity of the next one by stimulating more atoms to radiation than the flashlamp alone. The resultant laser beam energy, emergent from the system, then is the highest density laser radiation from the smallest fiber optics cone positioned at the exit of the laser system.

Since the flashlamps require a high voltage, in the neighborhood of 1000 to 1500 volts, to become energized, a direct-current battery operated system such a the present invention will require large, cumbersome, and expensive batteries to furnish this voltage. In order to overcome this disadvantage, the present invention uses small low-voltage high-amperage batteries in conjunction with a vibrating system to convert the D-C voltage to a pulsating voltage, to step it up to a required voltage by the use of a voltage transformer, rectify the pulsating voltage to a direct current, store it in capacitors, and then apply the stored energy to the flashlamps in a pulse form. This procedure reduces the size, weight, and the cost of the battery power supply.

Referring to the drawing, the invention comprises a laser generator housing 1 formed into the configuration of a rifle with its barrel enlarged for housing the various laser-generating parts. The housing 1 may be made of a suitable material such as aluminum, stainless steel, plastic, or the like. The housing 1 consists of a front section 2 with a chamber therein for housing the laser generator and its associated parts, and a rear section 3 with a chamber for accommodating the power supply with the associated parts thereof, as indicated in FIGURE 1. The front section 2, sectionally illustrated in FIGURE 4, contains the laser generator consisting of three ruby or neodymium-doped glass rods 4, 5, and 6, disposed alternately with fiber optics bundles 7, 8, and 9, respectively. The fiber optics bundle 9 is provided with a cylindrical extension 9a at its apex, which projects through an aperture 9b in the anterior wall of the front or forward chamber to the exterior thereof. The ruby rods are excited to laser emission by four flashlamps: the flashlamp 10 principally activates the ruby rod 4, the flashlamps 11 and 11a activate the ruby rod 5, and the flashlamp 12 activates the ruby rod 6, although the light from one flashlamp may cause excitation in the other two ruby rods to some extent. Between the flashlamps and the alternately interposed ruby rods and fiber optics bundles is a glass envelope 13, through which a cooling gas such as nitrogen or air, furnished under compression from a cylinder 14, circulates and cools the ruby rods to sustain their laser-emitting efficiency.

The cylinder 14 is a replaceable container of carbon dioxide, nitrogen, or compressed air such as those commercially available in four to six inch lengths and about one inch in diameter. Under a compression of 500 to 1000 pounds per square inch, the cylinder furnishes an adequate amount of gas to cool the laser for several hours of operation. The gas from the cylinder 14 can be released either in bursts or continuously, actuated by the laser trigger 15, which is connected to a valve 16 provided on the cylinder through a spring-restrained flexible cable 17; thus, when the laser trigger 15 is pulled to fire a spurt of gas is discharged into the glass envelope 13 to cool the laser rods. For continuous action, the laser safety switch (to be described presently) is turned off and the trigger 15 is maintained in pulled condition to allow the gas to circulate continuously.

A light-reflective concave plate 18 having its concave surface mirrored or highly polished is located in the posterior aspect of compartment 19 enclosing the flashlamp 10 and the ruby rod 4. The purpose of the plate or reflector 18 is: to reflect the light from the flashlamp 10 onto the rod 4. The compartment 19 is provided in its inferior aspect with an aperture 21 through which a conduit 22 leading from valve 16 of cylinder 14 passes and attaches to the glass envelope 13. The gas from the cylinder 14 flows through conduit 22 and the glass envelope 13 to the adjacence of fiber optics bundle 9 and emerges to the exterior through a short conduit 23 and hole 24 cut in the front wall 25 of section 2. The entire laser generating elements including the laser rods and fiber optics bundles are enclosed in an inner cylinder 26 attached to the external wall 27 of section 2. The cylinder 26 is provided with an aperture 28 opening into compartment 19 and a second aperture 29 leading into compartment 30 in the front part of cylinder 26.

The flashlamps 10, 11, 11a, and 12 are cooled by means of a liquid, such as water or some suitable fluid material, circulated by pump 31. The liquid flows through conduit 32 partially into compartment 19 through the hole 21 and partially through the chamber 33 surrounding the laser generating elements therein, and through hole 29 into the return conduit 34 which joins the pump 31 at point 35. The pump 31 may be operated by cranking the handle 36 manually. Thermal radiators 37 and 38 located on the periphery of forward section 2 serve to cool the circulating liquid by thermal radiation. A thermometer 39 located adjacent to compartment 19 indicates the temperature of the circulating liquid. (The symbol for water or liquid content in section 2 has not been drawn in order to enhance a clear view of the other elements contained therein.) Other parts, such as switches, indicator lights, and the laser trigger contained in section 2, will be described under appropriate discussions.

The rear section 3 of the laser generator housing can be described in detail by a reference to FIGURE 6, in which the rechargeable battery 40 receives a charging current from an external source 41 (nominal 110-volt AC) through the rectifying cells 42 and 43, or a charging direct current from a bank of solar cells 44 (to be discussed presently) to become continuously charged, with the solenoid-operated switch 45 in closed position. When the battery 40 is fully charged, the switch 45 automatically opens by means of a circuit breaking solenoid 46 to prevent overcharging the battery; the laser generator is then ready to operate.

In order to selectively generate any intensity of laser radiation up to the full capacity of the laser generator, any of the capacitor banks 47 through 50 may be charged by closing the respective switches 51 through 54, in accordance with the capacitance required. The individual capacitor banks 47 through 50 may be provided with equal capacitances, such as 300 microfarads per bank, or with unequal capacitances such as 250, 300, 350, and 400 microfarads, respectively. In the latter arrangement, varying capacitances from 250 to 1300 microfarads in steps of 50, 150, and 250 microfarads may be obtained. These capacitance values are only nominal and, therefore, much higher or lower values as required may be substituted.

Subsequent to the selection of the capacitor banks for the required capacitance, the main capacitor bank switch 55 and the main power switch 56 are successively turned on. This operation permits the electric current to flow from battery 40 to the step-up transformer 57, after passing through a conventional vibrator device 58, which converts the direct current from the battery 40 into a pulsating current, which then can be amplified by the transformer 57. Also, the main switch indicator lamp lights up, indicating that the capacitor banks are charging.

Simultaneously with the closing of the main switch 56, the stepped-up voltage from the transformer 57 is impressed across the solid-state rectifiers 60 and 61, rectified thereby, and the voltage waveform smoothed and voltage doubled by capacitors 62 and 63 before being applied on the selected capacitor bank or banks. When the selected capacitor banks are charged to the full voltage furnished by the rectifiers 60 and 61, the indicator lamp 64 lights up; the series resistor 65 value is so chosen that the light comes on only when the full voltage builds up across the capacitor bank. The resistance value of the series resistor 66 of lamp 58 is such that the lamp lights up as soon as the main switch 56 is turned on.

When the lamp 64 is lit, the safety switch 67 may be closed; the circuit is then ready for triggering the laser generator. This is accomplished by pulling the trigger 15, which operation closes the switch 68 receiving a low-voltage current from a small section 69 of battery 40. This action energizes the solenoid 70, which then closes the normally open switch 71, allowing the charged capacitor banks to discharge through the flashlamps 10, 11, 11a, and 12, whereupon the laser rods 4, 5, and 6 become incited to produce laser radiation. Since the capacitor discharge occurs in the form of a pulse through the flashlamps, unless the switch 55 is opened after the discharge, the capacitors begin to charge for the next pulse to occur. The trigger 15 may be actuated whenever the indicator lamp 64 lights up, indicating that the laser generator is ready for the next firing pulse.

For sustained replenishment of the battery charge, two types of current generating solar cells are provided in the laser system: (1) The solar cells designated by numeral 44 are self-activating type; and (2) those designated by numeral 72 are phosphorescent type. The solar cells 72 are in series connection and the total voltage is the sum of the individual cell voltages; they can be connected across the battery 40 by means of switch 73. There are 60 units of solar cells 72; they are arranged around the flashlamps 5 and 6 and their surfaces are electrically insulated. Each solar cell 72 meansures ¾ by ¾ inch in area and 1/16 inch thick. Each unit is made of an N- or P-diffused silcon wafer (diode) coated with a suitable phosphorescent material such as zinc sulfide or cadmium sulfide, which when illuminated by the flashlamps causes a voltage to be generated in the silicon wafer. A thin film of gold over the sulfide and one over the opposite surface of the silicon wafer from the positive and negative electrodes, as illustrated in FIGURE 7.

The solar cells 44 are constructed by placing two silicon wafers face to face and filling the intermediate space with a mixture of phosphor, such as cadimum sulfide, and a radioactive material such as a beta-ray emitting isotope. Such an isotope is strontium 90 or a less costly radioactive promethium 147, a nuclear fission biproduct. Beta rays emitted by the radioactive promethium cause the cadmium sulfide to phosphoresce and illuminate the silcon photocells, which in turn transform the light energy into an electric current to charge the batteries 40. Each solar cell 44 produces approximately 1 volt, and about 150 cells can be incorporated in the present invention. The illumination of the silicon cells is continuous from the radioactivated phosphor; this condition causes a continuous current to run into the batteries 40 until they are charged, whereupon the solenoid-operated current cutout switch 45 opens. When the batteries 40 charge runs down below a certain threshold level, the solenoid-actuated switch 45 closes, allowing the current from solar cells 44 to flow and charge the batteries 40.

For precise aiming the laser generator at a target, the aiming sights 74 and 75 may be positioned into a line of sight with respect to the target. The adjustment screw 76 may be used to fix the angle of elevation of the radiation beam to compensate for its refraction through the atmosphere.

Although a preferred embodiment of my invention is shown and described, the invention is susceptible to modification in the detail of construction and I reserve the right to make such alterations without departing from the spirit and scope of the invention.

I claim:

1. A directed-beam portable laser system with a self-charging power supply, comprising a housing constructed to form a rifle configuration having a forward and a rear section, each having a chamber therein, a plurality of solid-state laser rods including a plurality of light-concentrating means alternately arranged therebetween being disposed within the chamber of said forward section, one of said light-concentrating means having an integral cylinder to convert the laser radiation into a parallel beam prior to emergence thereof to the exterior from the front end of said housing, flashlamps positioned peripherally to said laser rods to activate said rods individually to emit radiation, a transparent envelope containing a cooling fluid disposed at the periphery of said laser rods and said light-concentrating means therebetween for circulating and cooling said laser rods to reflect direct and dispersed light upon said laser rods; a reservoir of cooling fluid disposed within the rear chamber of said housing and having means for circulating said cooling fluid through said transparent envelope; and, a self-generating power supply containing a radioactive material for activation of electric power therein including means for current alternating, amplifying, and rectifying positioned within said rear chamber to furnish energizing current to said flashlamps.

2. A directed-beam portable laser system with a self-charging power supply, comprising a housing constructed to form a rifle configuration having a forward and a rear chamber, laser-emitting ruby rods arranged a suitable distance from one another disposed in said forward chamber including light-concentrating conical fiber optic bundles alternately interposed between said ruby rods, forming axially thereof a recurrently reduced-diameter cylinder in cooperative respect with one another, flashlamps provided peripherally to said cylinder to activate said ruby rods to laser emission, and a D-C power supply disposed within the rear chamber of said housing and having in the circuit thereof rechargeable batteries and a system of vibrator, voltage amplifier and rectifier connected to the circuit thereof, a bank of capacitors disposed adjacent to said voltage rectifier and connected thereto for receiving and storing amplified voltage therefrom and discharging said voltage through said flashlamps to activate said ruby rods to emission of laser radiation, each of said fiber optics bundles being adapted to intensify the laser radiation received thereby by concentrating the intensity thereof to a beam diameter smaller than that of the ruby rod preceding said bundle.

3. A directed-beam portable laser system with a self-charging power supply, comprising a housing constructed to form a rifle configuration having a forward and a rear section, each with a chamber therein, a laser source comprising a plurality of laser-emitting means alternately interposed and intimately in abutment with a plurality of light-concentrating means disposed within the chamber of said forward section, flashlamps positioned adjacent to said laser-emitting means including a light-reflecting means therein to reflect light from said flashlamps upon said laser source to activate it to laser emission, and cooling means surrounding said laser source and said flashlamps to cool them for sustaining efficiency of emission from said laser source, and a direct-current power supply contained within the chamber of said rear section comprising rechargeable batteries, a vibrator connected to said batteries to convert the direct current from said batteries into a pulsating current, a step-up transformer to receive said pulsating current and step it up to a high-voltage current, a rectifier to rectify the stepped-up voltage from said transformer, and a bank of capacitors to receive and store the direct current from said rectifier, said power supply having a trigger switch within its circuit to discharge the stored power in said bank of capacitors into said flashlamps to illuminate and activate said laser source to emission of radiation therefrom.

4. A directed-beam portable laser system with a self-charging power supply, comprising a housing constructed to form a rifle configuration having a forward chamber and a rear chamber, a plurality of laser-emitting cylindrical rods spaced apart a suitable distance therebetween disposed in said forward chamber axially with respect to one another and to said chamber, a plurality of radiation-concentrating conical means with parallel frustum and base surfaces interposed in the spaces of said laser-emitting rods in intimate abutment therewith to converge the radiation from one laser rod positioned at the base thereof to the next rod positioned at the frustum thereof, thereby concentrating the intensity of said radiation emergent at the frustum thereof, laser-activating means positioned in the peripheries of said laser-emitting cylindrical rods to incite laser radiation in said rods, a high-voltage pulse-forming D-C power supply disposed within the rear chamber of said housing and having self-generating power sources connected to said laser-activating means to supply energizing power thereto, and means located within said housing and communicating with said forward chamber to furnish cooling fluid thereinto to cool said laser-emitting rods and said laser-activating means to sustain laser emission efficiency of said laser-emitting rods.

5. A directed-beam portable laser system with a self-charging power supply, comprising a housing shaped into the form of a rifle having a forward and a rear section, each section being provided with a chamber therein, a plurality of laser-emitting means including a plurality of light concentrating means interposed alternately within the chamber of said forward section to form a recurrently increasing-diameter cylinder extending from the forward end rearward of said housing and axially thereto, flashlamps positioned adjacent said laser-emitting means to illuminate and thereby activate said laser-emitting means, a transparent envelope having a fluid effluent therein disposed in said forward chamber surrounding said laser-emitting means and said light-concentrating means for cooling both of said means to maintain efficiency of laser emission of said laser-emitting means, a reflective plate positioned within said forward chamber transversely thereto and posteriorly to said laser-emitting means in optically reflective relation thereto to reflect radiation from said flashlamps and said laser-emitting means unto said light-concentrating means, and fluid means within said forward chamber surrounding said flashlamps and said envelope for cooling said flashlamps by circulating therethrough by means of a hand-pump incorporated in the rear section of said housing.

6. A direct-beam portable laser system with a self-charging power supply, comprising a housing constructed to form a rifle configuration having a forward chamber with an aperture in the front end thereof and a rear chamber, a laser source disposed within said forward chamber comprising a plurality of ruby rods of varying diameters arranged from the front end rearward including a plurality of light-concentrating fiber-optics cones of increasing sizes interposed successively in alternate relation to said ruby rods corresponding to the diameters thereof and axially to said chamber, with the smallest of said fiber-optics cones being positioned adjacent said front end of said forward chamber and projecting partially through said aperture to the exterior of said housing, flashlamps provided on the peripheries of said ruby rods to activate said rods to emission of laser radiation with said fiber optics cones successively concentrating the beam intensity and projecting said beam toward said smallest fiber optics cone, which being provided at the terminal end thereof with a short cylinder for converting said beam into a high-intensity pencil beam emergent therefrom, said housing containing a power supply in the rear chamber thereof, said power supply having a self-generating current source connected through a bank of capacitors therein to said flashlamps and a laser-triggering mechanism in the circuit of said power supply to discharge the energy of said capacitors through said flashlamps, and compressed fluid means provided in said housing and communicating with said forward chamber to cool said laser source, said fluid means having an actuating means cooperative with said laser-triggering mechanism and controlled thereby.

7. A directed-beam portable laser system with a self-charging power supply, comprising an elongated housing having a forward and a rear section, each with a chamber therein, the chamber of said forward section being provided with an aperture in its anterior wall, a laser source having a plurality of laser-emitting ruby rods including a plurality of light-concentrating means interposed alternately therebetween to form a single cylinder of recurrently increasing-diameter sections disposed within the chamber of said forward section and extending axially thereto, one of said light-concentrating means being conical and having a uniformly elongated cylindrical extension at its apex disposed adjacent said aperture of said forward section with said extension protruding outwards therethrough, adjacently located to said conical light-concentrating means being one of said ruby rods having a right-circular end surface provided with a reflective coating and being in abutment with the base surface of said conical light-concentrating means, individual flashlamps positioned adjacent said laser rods for activation thereof to laser emission, a light reflective plate disposed in the chamber of said forward section in posterior relation to said single cylinder and perpendicular to the axial plane thereof to reflect light from one of said flashlamps onto one of said ruby rods adjacently positioned to said reflective plate, said emission from said ruby rods being intensified as it passes through said light-concentrating means prior to emergence through the cylindrical extension of said conical light-concentrating means to the exterior of said elongated housing.

8. A directed-beam portable laser system with a self-generating power supply, comprising an elongated housing provided with a front and a rear chamber, a laser-generating source having a plurality of varying-diameter cylindrical ruby rods disposed within said front chamber and axially arranged therein in consecutively changing order of diameters forwardly to said chamber and spaced apart a suitable distance one from the other for reciprocally projecting laser beam one to another in regeneratively stimulating laser radiation therebetween, included in the spaces thereof a plurality of different-size conical light-concentrating means each of which having a base and a frustum surface corresponding to the diameters of the ruby rods at each end thereof for concentrating the laser radiation incident on a base surface from the preceding ruby rod to a smaller diameter ruby rod contiguous with the frustum thereof, thereby limiting the emergent laser beam diameter to the frustum diameter of the last conical means through which said laser beam projects to the exterior of said housing, an array of flashlamps positioned peripherally to said ruby rods and to activate them to laser emission, and a unidirectional-current power supply disposed within said rear chamber and connected to said flashlamps, said power supply being provided in the circuit thereof with means to convert said unidirectional current into a pulsating current, a second means to step up the voltage of said pulsating current, a third means to rectify said pulsating current from said second means, and a fourth means to store the rectified current from said third means and to discharge it in a single pulse through said flashlamps for energizing them to a high-intensity light emission.

9. A directed-beam portable laser system with a self-generating power supply, comprising a housing constructed to form a rifle configuration having therein a forward chamber with a front-end aperture and a rear chamber, a laser-generating source comprising a plurality of cylindrical laser rods of successively increased diameters having right-circular end surfaces half-mirrored and spaced apart one from the other a suitable distance in axial respect thereof to regeneratively stimulate laser radiation therebetween, the larger-diameter laser rod being positioned rearwardly and the smallest-diameter rod being positioned in the forward end of said housing, flashlamps provided on the periphery of each of said laser rods for activation thereof to emission of radiation; a plurality of different-diameter coniform fiber optics rods having parallel frustums and bases corresponding to the end surfaces of the respective laser rods alternately interposed therebetween to intensify said laser radiation as it passes through said frustums, one of said fiber optic rods of smallest base diameter having at the frustum thereof an integrally formed fiber optics cylinder and being positioned by its base in intimate contact with the end surface of said laser rod in the forward end of said housing; a radiation reflective plate disposed in said forward chamber in the posterior relation of said rearwardly-positioned laser rod to reflect light thereonto from a flashlamp adjacent thereto; a self-generating power supply positioned in said rear chamber and having a switch for triggering laser action by pulsing said flashlamps; the laser radiation from said laser rods being intensified in said laser-generating source and converted into a parallel laser beam by said fiber optics cylinder prior to emergence from the front end aperture of said forward chamber.

10. A directed-beam laser system with a self-charging power supply, comprising a housing constructed to form a rifle configuration having therein a rear chamber and a forward chamber with an aperture in its front wall, a cylindrical laser-generating source disposed axially within said forward chamber in adjacent relation to said aperture and comprising axially spaced varying-diameter ruby rods and included in the spaces thereof coniform fiber optics bundles alternately arranged with the frustum and base surfaces thereof in intimate abutment with the end surfaces of the corresponding ruby rods in cooperative respect thereto for transmission and intensification of laser radiation therethrough, one of said conical fiber optics bundles having a uniformly cylindrical reduced section being positioned at the forward terminal end of said cylindrical laser-generating source, with said cylindrical reduced section passing to the exterior of said housing through said aperture in the wall of said forward chamber to concentrate the emergent laser beam from said laser-generating source into a pencil beam corresponding to the diameter of said reduced section, flashlamps positioned at the periphery of said laser-generating source to activate said ruby rods to laser emission, and a D-C power supply disposed within said rear chamber and connected to said flashlamps to furnish energizing current thereto, comprising a bank of rechargeable batteries and connected in the circuit thereof being two sets of voltage-generating solar cells, one of which sets being located adjacent said flashlamps and activated thereby to voltage generation and the second of said sets having a radio-active material in mixture with a phosphor to cause phosphorescence thereof and adapted to convert the energy of said phosphorescence into electric energy to continuously charge said bank of batteries, and a laser-triggering switch located externally to said housing and connected to the circuit of said power supply to turn on and off said power supply energizing said flashlamps.

11. A directed-beam portable laser system with a self-charging power supply, comprising a housing to form a rifle configuration having therein a forward chamber and a rear chamber, a laser-generating source comprising a plurality of varying-size laser-emitting right-circular cylinders spaced apart a suitable distance one from the other to cooperatively stimulate laser radiation in one another and a plurality of radiation-concentrating different-size coniform bars with parallel frustums and bases of diameters corresponding to those of said laser-emitting cylinders alternately included in the spaces of said right-circular cylinders in intimate contact therewith to form an elongated circular member of recurrently magnified coniform sections disposed within said forward chamber axially thereto, flashlamps provided on the periphery of said elongated circular member to illuminate and activate said laser-emitting cylinders to laser radiation, said alternately disposed coniform bars being adapted by the configurations thereof to concentrate the laser radiation received at the base sections thereof and to transmit it to the adjacent laser-emitting cylinder at the frustums thereof, a self-generating power supply contained within the rear chamber and comprising in the circuit of said power supply being a bank of rechargeable batteries, a radio-active current generator and a phosphorescent current generator to charge said batteries, a vibrator mechanism connected to said batteries to convert the D-C voltage thereof to a pulsating voltage, a transformer in the circuit of said vibrator to step up said pulsating voltage, a rectifying system connected to the output of said transformer to convert said stepped-up pulsating voltage to a high-voltage direct current, and a bank of capacitors connected to said high-voltage direct-current circuit to store said high-voltage energy for discharging it through said flashlamps, and a dual cooling system positioned within said housing, one of which furnishing liquid to said forward chamber to cool said flashlamps therein and the second of which being connected mechanically to a laser-triggering switch contained in the circuit of said power supply to furnish a gaseous effluent, by manipulation of said switch and thereby emission of said effluent, to cool said laser-emitting cylinders to maintain the efficiency of laser emission thereof.

References Cited

UNITED STATES PATENTS 3,271,696  8/1966  De Ment _____ 331—94.5
3,289,099  11/1966  Masters _____ 331—94.5

OTHER REFERENCES

Current Topics (Portable Solid State Laser). Franklin Institute Journal, vol. 273 (March 1962), pp. 262 and 263.

New Army Rifle Hurls Light Rays. The Washington Post, March 4, 1964, p. A6.

JEWELL H. PEDERSEN, Primary Examiner

WILLIAM L. SIKES, Assistant Examiner